(12) United States Patent
Keller

(10) Patent No.: US 6,881,394 B2
(45) Date of Patent: Apr. 19, 2005

(54) STEAM REFORMER FOR METHANE WITH INTERNAL HYDROGEN SEPARATION AND COMBUSTION

(75) Inventor: Alfred E. Keller, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 265 days.

(21) Appl. No.: 10/166,801

(22) Filed: Jun. 11, 2002

(65) Prior Publication Data

US 2003/0066240 A1 Apr. 10, 2003

Related U.S. Application Data

(60) Provisional application No. 60/328,035, filed on Oct. 9, 2001.

(51) Int. Cl.[7] ............................... C01B 3/26; B01J 8/02
(52) U.S. Cl. .................... 423/652; 48/197 R; 48/198.7; 422/188; 422/189; 422/190; 422/211
(58) Field of Search ............................ 48/127.9, 197 R, 48/198.7; 252/373; 423/648.1, 652

(56) References Cited

U.S. PATENT DOCUMENTS

| | | | |
|---|---|---|---|
| 5,510,056 A | 4/1996 | Jacobs et al. | ................ 252/373 |
| 5,637,259 A | 6/1997 | Galuszka et al. | ........... 252/373 |
| 6,231,831 B1 | * 5/2001 | Autenrieth et al. | ...... 423/648.1 |

OTHER PUBLICATIONS

A.K. Prabhu et al., "Supported nickel catalysts for carbon dioxide reforming of methane in plug flow and membrane reactors," Applied Catalysis A: General 183 (1999) 241–252.
A.K. Prabhu et al., "Development of a Hydrogen Selective Ceramic Membrane and Its Application for the Conversion of Greenhouse Gases," Chemistry Letters (1999) 213–14.
Harold Gunardson, "Synthesis Gas Manufacture," Chapter 2, Industrial Gases In Petrochemical Processing, Marcel Dekker, Inc. (1998) 41–80.

* cited by examiner

Primary Examiner—Stanley S. Silverman
Assistant Examiner—Maribel Medina
(74) Attorney, Agent, or Firm—Conley Rose P.C.

(57) ABSTRACT

Preferred embodiments of the present invention generate a synthesis gas with a molar ratio of hydrogen to carbon monoxide of approximately 2:1 required for Fischer-Tropsch synthesis. Additional hydrogen produced in the steam reforming of methane beyond the requirements for the Fischer-Tropsch reaction is separated from the product gases of the reformer by the use of a hydrogen permeable membrane. Air is passed over the outside of the tube. As the hydrogen contacts the air, it is combusted with oxygen in the air to form water and release the heat necessary to drive the steam reforming reaction.

18 Claims, 4 Drawing Sheets

STEAM REFORMER FOR METHANE WITH INTERNAL HYDROGEN SEPARATION AND COMBUSTION

RELATED APPLICATIONS

This application claims priority to U.S. Provisional Patent Application No. 60/328,035, filed Oct. 9, 2001, incorporated herein by reference.

STATEMENT REGARDING FEDERALLY SPONSORED RESEARCH

Not applicable.

FIELD OF THE INVENTION

The present invention generally relates to auto-thermal heating of an endothermic reaction by combusting a reaction by-product. More particularly, the present invention relates to an apparatus and method for producing synthesis gas from methane by an endothermic steam reforming reaction wherein a hydrogen permeable membrane separates excess hydrogen produced by the reaction and the excess hydrogen is combusted to provide heat to the endothermic steam reforming reaction.

BACKGROUND OF THE INVENTION

Large quantities of methane, the main component of natural gas, are available in many areas of the world. However, a significant portion of that natural gas is situated in areas that are geographically remote from population and industrial centers ("stranded gas"). The costs of compression, transportation, and storage often makes the stranded gas' use economically unattractive. Consequently, the stranded natural gas is often flared. Flaring not only wastes the energy content and any possible economic value the natural gas may have but also creates environmental concerns.

To improve the economics of natural gas transportation and utilization, much research has focused on using the methane component of natural gas as a starting material for the production of higher hydrocarbons and hydrocarbon liquids. The conversion of methane to hydrocarbons is typically carried out in two steps. In the first step, methane is reacted to produce carbon monoxide and hydrogen (i.e., synthesis gas or "syngas"). In a second step, the syngas is converted to higher hydrocarbon products by processes such as Fischer-Tropsch synthesis. For example, fuels with boiling points in the middle distillate range, such as kerosene and diesel fuel, and hydrocarbon waxes may be produced from the syngas. In addition, syngas may be used for the manufacture of ammonia, hydrogen, methanol, and other chemicals. Less traditional uses of syngas continue to be developed and have increased in importance in recent years, such as in the production of acetic acid and acetic anhydride manufacture. Among the promising new developments in syngas chemistry are routes to ethylene.

The syngas routes may be attractive in themselves, regardless of raw materials used; they may also provide the option to use alternative and ultimately cheaper raw materials such as coal and, in certain circumstances, natural gas. One of the attractions of syngas is that it can be manufactured from almost any raw material containing carbon; hence, the availability of feedstock is ensured.

The cost of syngas can be highly variable, depending on the effluent hydrogen/carbon monoxide ratio desired, the raw materials available, the production process, the scale of operation and extent of integration with other processes, and other factors. As described below, the current methods for producing syngas all have negative aspects, which result in inefficiencies, and in turn, a higher cost of producing syngas.

There are currently three primary reactions for converting methane to syngas. Those methods include: steam reforming (the most widespread), dry reforming (also called $CO_2$ reforming), and partial oxidation. Steam reforming, dry reforming, and partial oxidation proceed according to the following reactions respectively:

$$CH_4 + H_2O + heat \rightarrow CO + 3H_2 \qquad (1)$$

$$CH_4 + CO_2 + heat \rightarrow 2CO + 2H_2 \qquad (2)$$

$$CH_4 + \tfrac{1}{2}O_2 \rightarrow CO + 2H_2 + heat \qquad (3)$$

For a general discussion of steam reforming, dry (or $CO_2$) reforming, and partial oxidation, please refer to HAROLD GUNARDSON, *Industrial Gases in Petrochemical Processing* 41–80 (1998), the contents of which are incorporated herein by reference for all purposes.

As noted in reaction 1, steam reforming is endothermic (requires heat); therefore, heat must be supplied to drive the reaction. One way to provide the necessary heat is to burn a portion of the available natural gas in process heaters. However, because some of the available natural gas is burned to heat the reactor, less natural gas is available to be converted to synthesis gas and the overall yield is lower than if all of the natural gas were converted to syngas. Other methods of supplying heat to the steam reforming reaction at remote well sites are often cost prohibitive. In addition, the steam reforming reaction is relatively slow, thereby requiring relatively long reactor residence times and correspondingly large reactors. These typically large steam reforming plants are usually not practical to set up at remote natural gas well sites.

Partial oxidation of hydrocarbons can also be used to produce syngas. Partial oxidation of hydrocarbons to produce syngas typically takes place in the presence of a catalyst. In catalytic partial oxidation ("CPOX"), natural gas is mixed with air, oxygen-enriched air, or oxygen, and introduced to a catalyst at elevated temperature and pressure. The methane reacts exothermically with oxygen to form syngas. A specific example of a CPOX process is set forth in U.S. Pat. No. 5,510,056 to Jacobs, et al., incorporated herein by reference for all purposes.

Recently, CPOX of methane has attracted much attention due to its inherent advantages, such as the fact that due to the significant heat that is released during the process, there is no requirement for the continuous input of heat in order to maintain the reaction. This is in contrast to steam reforming processes, which generally use external gas firing that decreases total liquid product yields (discussed above). CPOX also has space saving advantages. CPOX is a very fast reaction; therefore, reactor residence times are much less than those needed for steam reforming and thus, smaller reactors are acceptable. In addition, CPOX produces syngas with the optimal 2:1 $H_2$:CO molar ratio for Fischer-Tropsch reactions, and has a simplified catalytic reaction plant section.

CPOX is not without its drawbacks. In CPOX, oxygen and methane must be mixed in the presence of a catalyst. Mixing of these components in certain temperature and pressure regimes can potentially lead to explosions, fires, and equipment failures. Because of this, CPOX has so far been substantially limited to low pressures due to the safety concerns. In addition, although it is possible to conduct a partial oxidation reaction in the presence of air or oxygen-enriched air it is often preferable to conduct the reaction in the presence of substantially pure oxygen because if other than substantially pure oxygen is used, diluants in the air (e.g., $N_2$) will require the use of a much larger reactor, thus increasing the cost to build and operate and reducing or eliminating the size advantage of CPOX over steam reforming. Unfortunately, separation, compression, and handling of the substantially pure oxygen can be very expensive.

Another process for producing syngas is autothermal reforming ("ATR"). ATR is basically a combination of partial oxidation and steam reforming carried out in a single reactor. The heat released by the exothermic partial oxidation reaction is used to drive an endothermic steam reforming reaction in another part of the reactor.

One of the features of ATR is that it requires no external fuel. ATR also reduces, but does not eliminate, some of the safety issues involved with CPOX because a burner is used. The burner allows for the safe mixing and combustion of methane with oxygen. However, ATR also has negative aspects. For example, large amounts of $CO_2$ are generated in the partial oxidation portion of an ATR reactor. This reduces the overall conversion of methane to CO. Additionally, removal of that $CO_2$ increases the expense of the overall processing scheme. A detailed discussion of ATR is included on pages 61–66 of the GUNARDSON referenced cited above.

With regard to the membrane art, research done by Prabhu, Radhakrishnan, and Oyama (PRABHU, ET AL., *Supported Nickel Catalysts for Carbon Dioxide Reforming of Methane in Plug Flow and Membrane Reactors*, APPLIED CATALYSIS A: GENERAL 241–52 (1999) ("PRABHU, ET AL.")), incorporated herein by reference in its entirety for all purposes, discloses the use of a hydrogen permeable membrane to separate hydrogen from the reaction product of a dry reforming reaction to shift equilibrium conditions and increase the methane conversion in the reactor. As is shown in FIG. 9 of PRABHU, ET AL., the Vycor® membrane used was effective up to a temperature of at least 1023 K. It should be noted that the PRABHU, ET AL. reference does not teach the combustion of the permeated hydrogen and instead uses a Hoskins tubular furnace to drive the endothermic dry reforming reaction. Likewise, U.S. Pat. No. 5,637,259 to Galuszka et al., incorporated herein by reference for all purposes, discloses the use of a hydrogen permeable membrane to separate hydrogen from the reaction product of a dry reforming reaction and a catalytic partial oxidation reaction to shift equilibrium conditions and increase the methane conversion and the $H_2$ and CO selectivities in the reactor. Like PRABHU ET AL., Galuszka et al. does not teach the combustion of the separated hydrogen to drive the reaction or the use of a membrane in conjunction with a steam reforming reaction.

Because syngas is used in both methanol, Fischer-Tropsch, and other syntheses, the demand for syngas remains high. This has fueled syngas research, which has resulted in processes such as steam reforming, CPOX, and ATR. However, while these competing processes have benefits, they also have flaws or limitations, which ultimately limit their utility. Therefore, there exists a need for new processes that exhibit at least some of the positive features of these competing processes, while reducing or eliminating the negative features or limitations.

SUMMARY OF THE INVENTION

The present invention embodies some of the positive features of steam reforming, CPOX, and ATR, while reducing some of the negative aspects. The result is a hybrid process that approaches the relatively high yield of partial oxidation while reducing the safety and pressure concerns. Like ATR, the new process uses internal combustion to heat the process, but greatly reduces the $CO_2$ generation and safety concerns of ATR.

In a preferred embodiment of the present invention, an apparatus for producing syngas includes a steam reforming catalyst bed, a hydrogen permeable membrane, and a substantially enclosed combustion zone, where the hydrogen permeable membrane separates the catalyst bed from the combustion zone.

In another preferred embodiment of the present invention, a process for producing syngas includes contacting a feed stream of methane and water with a catalyst in a reaction zone maintained at steam reforming conditions effective to produce an effluent stream of hydrogen and carbon monoxide at a ratio of about 3:1 and removing excess hydrogen via a hydrogen permeable membrane to produce an effluent stream of hydrogen and carbon monoxide at a ratio of about 2:1. The removed excess hydrogen is combusted in a combustion zone to provide heat to drive the endothermic steam reforming reaction in the reaction zone.

Another preferred embodiment comprises a reactor system for carrying out an endothermic reaction to form reaction products comprising a first substantially enclosed reactor zone and a second substantially enclosed reactor zone in physical and thermal contact with the first reactor zone. The physical interface between the first and second reactor zones defines a contact surface, where at least a portion of the contact surface (and possibly the entire contact surface) comprises a selectively permeable membrane for allowing a first gas, such as hydrogen, to pass from the second reactor zone to the first reactor zone. The first reactor zone is adapted for combusting the first gas and the second reactor zone is preferably adapted for carrying out an endothermic reaction, such as steam or dry reforming of a hydrocarbon, which produces a gaseous reaction product, such as syngas. The combustion of the first gas supplies heat to at least partially (and possibly completely) drive the endothermic reaction.

The preferred reactor system can be designed such that the second reactor zone is substantially contained within the first reactor zone, the second reactor zone is adjacent to, but not substantially contained within, the first reactor zone, or the first reactor zone is substantially contained within the second reactor zone.

The second reactor zone preferably contains a catalyst to catalyze the endothermic reaction, and the first reactor zone preferably contains a means for initiating the combustion of the first gas, such as described herein.

Another preferred embodiment further comprises a third substantially enclosed zone in physical contact with the second reactor zone, the physical interface between the second reactor zone and the third zone defines another contact surface, where at least a portion of (and possibly all of) the contact surface comprises a selectively permeable membrane for allowing the first gas to pass from the second reactor zone to the third zone. Also preferably included is a recycle stream for recycling the first gas from the third zone into the first zone.

Another preferred embodiment includes a method for conducting an endothermic reaction, including providing a first reactor defining a reaction zone and having a feed stream intake opening and a product stream outlet opening; providing a second reactor defining a combustion zone and having an oxygen intake opening and an exhaust opening;

providing a selectively permeable membrane between and separating the reaction zone and the combustion zone; conducting an endothermic reaction, preferably the steam reforming of the methane to produce syngas, which produces excess combustible gas, preferably hydrogen, in the reaction zone, where at least some of the excess combustible gas permeates through the selectively permeable membrane into the combustion zone; and combusting at least some of the permeated excess combustible gas in the combustion zone, where heat generated by the combustion of the combustible gas drives the endothermic reaction in the reaction zone.

Another preferred embodiment includes a method for producing syngas with a hydrogen to carbon monoxide ratio of about 2:1 comprising the steps of providing a combustion reactor having an oxygen intake opening and an exhaust opening; providing a steam reforming reactor having walls and a feed stream intake opening and a product stream outlet opening, wherein the steam reforming reactor is substantially inside of the combustion reactor and the walls of the steam reforming reactor comprise a substantially hydrogen only permeable membrane; providing a catalyst system inside of the steam reforming reactor to catalyze the steam reforming of methane to produce syngas with a hydrogen to carbon monoxide ratio of about 3:1, wherein about ⅓ of the hydrogen generated permeates through the substantially hydrogen only permeable membrane into the combustion reactor; and combusting the permeated hydrogen in the combustion reactor to provide heat to drive the endothermic steam reforming reaction in the steam reforming reactor.

Another preferred embodiment includes a process for producing a syngas stream with a hydrogen to carbon monoxide molar ratio of a predetermined amount, such as 2:1, the process comprising a means for steam reforming a hydrocarbon containing feed stream, such as methane or natural gas, to produce a syngas stream with a hydrogen to carbon monoxide ratio of greater than the predetermined amount, such as a catalyst system for steam reforming; a means for in-situ separating excess hydrogen from the syngas stream; and a means for combusting at least a portion of the excess hydrogen to produce heat to drive the means for steam reforming. In addition, preferably, there is included a means for supplying oxygen to the means for combusting and a means for exhausting the combusted hydrogen from the means for combusting.

The catalyst system preferably comprises a catalyst support and a catalyst, such as described herein.

Another preferred embodiment includes a reactor system for carrying out steam reforming of methane to produce synthesis gas, the reactor system comprising a first reactor comprising a steam reforming zone containing a catalyst bed, a reactant gas inlet and a product gas outlet; a second reactor at least partially surrounding the first reactor and comprising an $H_2$ combustion zone, an oxygen inlet and an exhaust gas outlet; and a thermally conductive substantially $H_2$ only permeable membrane disposed between the reforming zone and the combustion zone. The catalyst bed contains a catalyst capable of catalyzing the steam reforming of methane to produce synthesis gas under reaction promoting conditions.

Another preferred embodiment includes a method of reducing the $H_2$:CO molar ratio of a synthesis gas stream comprising providing a reactor system including: a first reactor having a steam reforming zone containing a catalyst bed, a reactant gas inlet and a synthesis gas outlet, a second reactor at least partially surrounding the first reactor and comprising a combustion zone, an air inlet and an exhaust gas outlet, and a thermally conductive substantially hydrogen only permeable membrane disposed between the reforming zone and said combustion zone; contacting a mixture of methane and steam in the steam reforming zone with a catalyst capable of catalyzing the reaction $CH_4 + H_2O \leftrightarrow H_2 + CO$ under reaction promoting conditions to provide a stream of product gas comprising hydrogen and carbon monoxide in a molar ratio of about 3:1; maintaining a higher gas pressure in the first reactor than in the second reactor, such that a portion of the hydrogen product gas passes through the membrane into the combustion zone; mixing a source of oxygen with the portion of hydrogen product gas in the combustion zone; igniting the hydrogen and oxygen in the combustion zone to produce heat; conducting at least a portion of the heat into the steam reforming zone such that the steam reforming reaction is at least partially sustained by the heat; and harvesting a modified synthesis gas stream comprising a molar ratio less than about 3:1 of $H_2$:CO. Preferably, the method also includes harvesting a modified synthesis gas stream having a molar ratio of $H_2$:CO of about 2:1.

Another preferred embodiment includes a reactor system for carrying out an endothermic reaction to form reaction products, the reactor system comprising a first substantially enclosed reactor zone; a second substantially enclosed reactor zone in thermal contact with the first reactor zone; and a selectively permeable membrane system separating the first reactor zone from the second reactor zone. The second reactor zone is adapted for carrying out the endothermic reaction which produces a first combustible gas. The selectively permeable membrane system is adapted to help extract the first combustible gas from the first reactor zone into the second reactor zone. The first reactor zone is adapted for combusting the first combustible gas, and the combustion of the first combustible gas supplies heat to at least partially drive the endothermic reaction.

Another preferred embodiment includes a reactor system for carrying out an endothermic reaction, the reactor system comprising a reaction zone substantially enclosed by a selectively permeable membrane; a combustion zone surrounding the selectively permeable membrane, wherein the combustion zone is substantially enclosed by a reactor shell. The reactor shell has an oxygen inlet and an exhaust outlet. The reaction zone has a reactant inlet and a product outlet. The reactor system comprises a plurality of sections including at least an anterior section and a posterior section (and preferably, but not necessarily, an intermediate section), and the plurality of section are detachable from each other when the reactor system is not in use.

The present invention generally avoids some of the negative features of steam or dry reforming, CPOX, and ATR, while capturing some of the benefits of these processes. The result is a more efficient, lower cost syngas process.

BRIEF DESCRIPTION OF THE DRAWINGS

For a more detailed understanding of the present invention, reference is now made to the accompanying figures. In the accompanying of figures substantially similar components have been identically numbered for ease of reference.

DETAILED DESCRIPTION OF THE INVENTION

Figure 1:
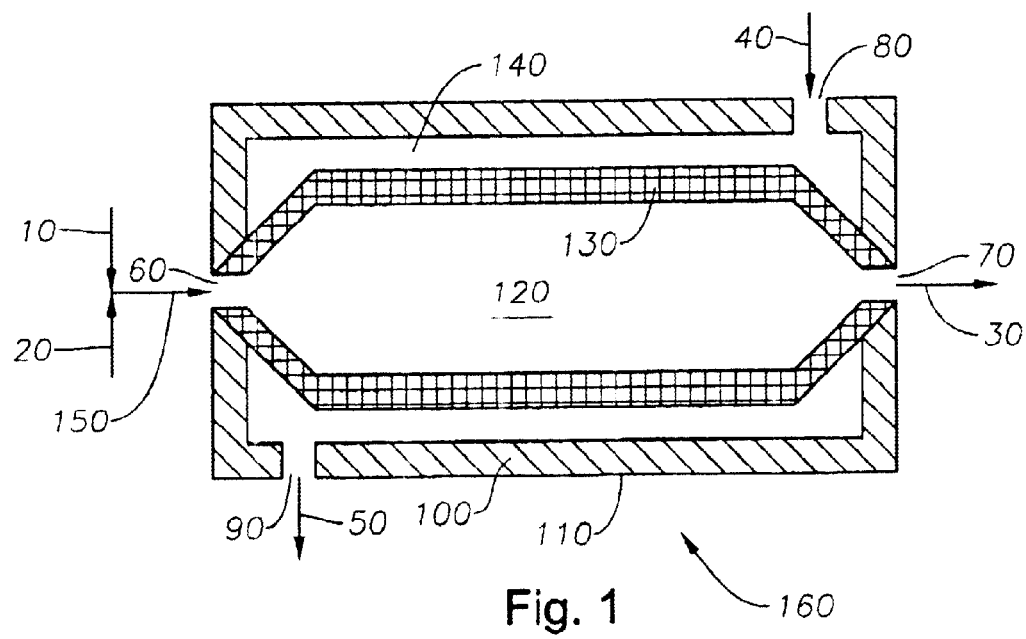
FIG. 1 is a cross-sectional schematic drawing of a first embodiment of the present invention.

Referring now to FIG. 1, one embodiment of the present system, reformer reactor 160 includes a steam reforming reaction chamber 120, a reactor inlet 60 and a syngas outlet 70. Reaction chamber 120 is substantially encased by a hydrogen permeable membrane 130 and a combustion zone 140. Combustion zone 140 is substantially encased by a refractory lining 100 and metal shell 110 having an air inlet 80 and an exhaust opening 90. The reaction chamber 120 includes a catalyst system as herein defined.

In operation, methane stream 10 and water stream 20 are blended to comprise a methane-water feed stream 150. Methane-water feed stream 150 enters steam reforming reaction chamber 120, where a steam reforming reaction takes place accordingly. Excess hydrogen is separated internally by use of substantially hydrogen only permeable membrane 130 in the reformer reactor. This excess hydrogen feeds into combustion zone 140. Air 40 is drawn into the combustion chamber 140 through air inlet 80 where it is combusted with the excess hydrogen to supply heat to and drive the endothermic steam reforming reaction taking place in reaction chamber 120. The exhaust 50, composed of the product of the hydrogen combustion along with any other gases in the combustion chamber, are then exhausted through the exhaust opening 90. The combustion can be initiated by catalyst in the combustion zone, by establishing a flame or spark, by auto-ignition, or by any other acceptable method. The heat generated from the hydrogen combustion maintains the high temperatures necessary for steam reforming inside reaction chamber 120, resulting in a product stream 30 containing primarily syngas which exits chamber 120 via syngas outlet 70.

Figure 2:
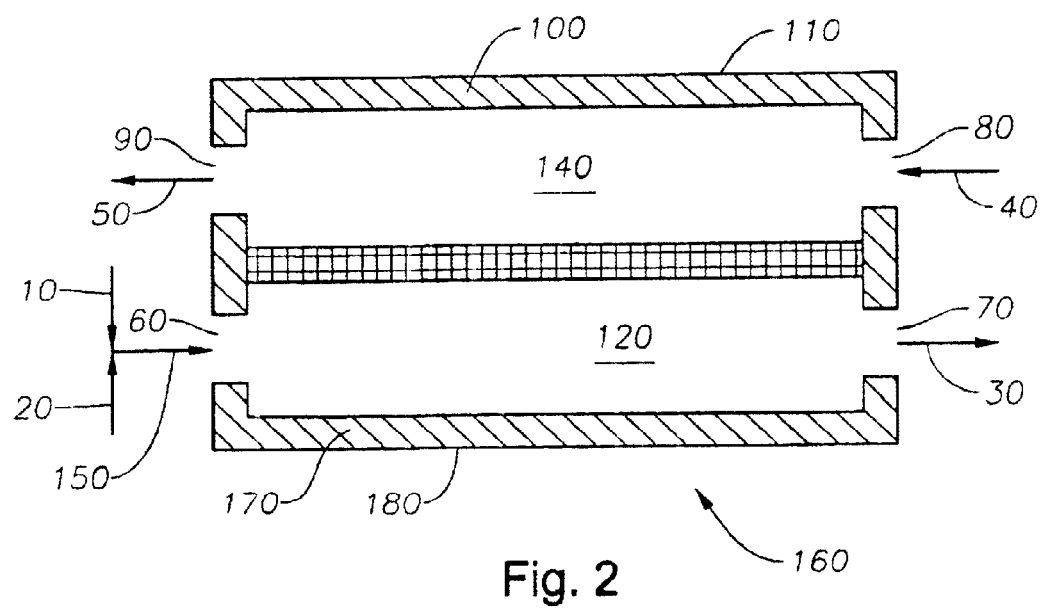
FIG. 2 is a cross-sectional schematic drawing of a second embodiment of the present invention.

Referring now to FIG. 2, a second embodiment of the present system, reformer reactor 160 includes a steam reforming reaction chamber 120, a reactor inlet 60 and a syngas outlet 70. Reaction chamber 120 is encased by a hydrogen permeable membrane 130, refractory lining 170, and metal shell 180. Combustion zone 140 is encased by a refractory lining 100 and metal shell 110 having an air inlet 80 and an exhaust opening 90. The reaction chamber 120 includes a catalyst system as herein defined.

In operation, methane stream 10 and water stream 20 are blended to comprise a methane-water feed stream 150. Methane-water feed stream 150 enters steam reforming reaction chamber 120, where a steam reforming reaction takes place accordingly. Excess hydrogen is separated internally by use of substantially hydrogen only permeable membrane 130 in the reformer reactor. This excess hydrogen feeds into combustion zone 140. Air 40 is drawn into the combustion chamber 140 through air inlet 80 where it is combusted with the excess hydrogen to supply heat and drive the endothermic steam reforming reaction taking place in reaction chamber 120. The product of the hydrogen combustion, along with any other gases in the combustion chamber are then exhausted through the exhaust opening 90. The combustion can be initiated by catalyst in the combustion zone, by establishing a flame or spark, by auto-ignition, or by any other acceptable method. The heat generated from the hydrogen combustion maintains the high temperatures necessary for steam reforming inside reaction chamber 120, resulting in a product stream 30 containing primarily syngas which exits chamber 120 via outlet 70.

Figure 3:
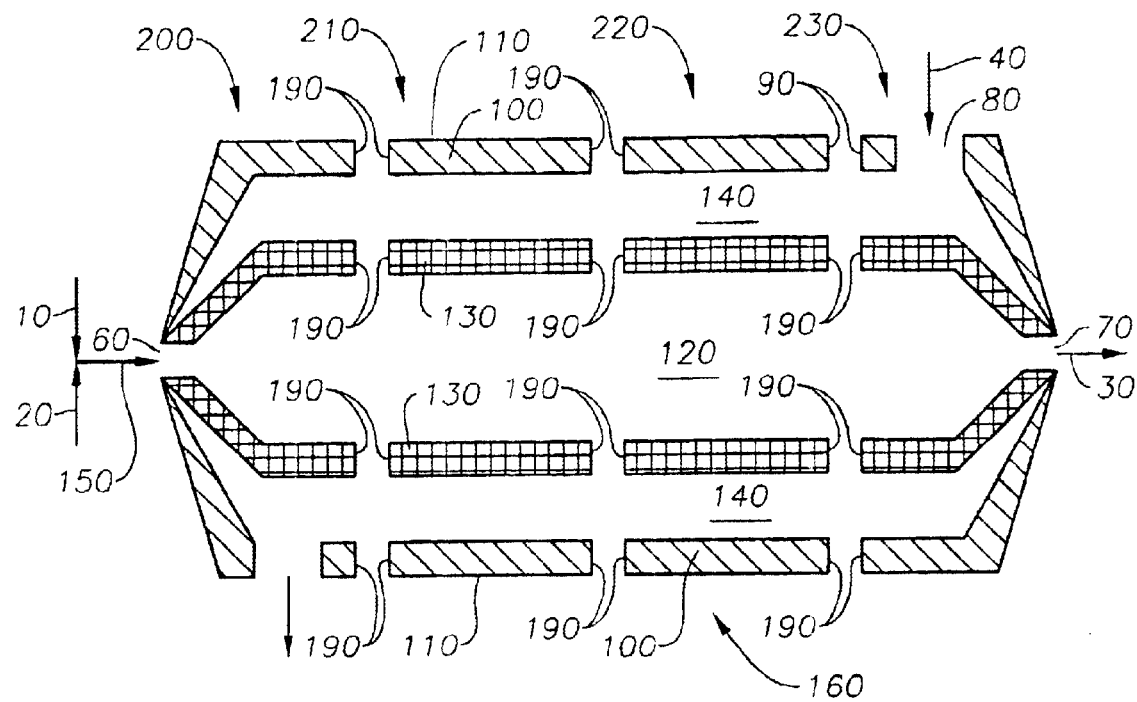
FIG. 3 is a cross-sectional schematic drawing of a third embodiment of the present invention.

Referring now to FIG. 3, there is shown an adjustable stackable embodiment of the present invention. In this embodiment, four individual components 200, 210, 220, and 230 of the reactor system 160 can be assembled to form an assembled reactor system, (such as, for example, the reactor system of FIG. 1). The component interfaces 190 are designed, as is well known in the art, to connect and interface such that overall reactor performance is not substantially hindered. It is also envisioned that the embodiment of FIG. 3 could be expanded or contracted in size by varying the number of intermediate sections (e.g., 210 and 220) from one to several. The optimal length, as also with FIG. 1 and FIG. 2, is to be determined by one of ordinary skill in the art and may vary depending on the ultimate product stream application and the physical limitations of the manufacturing materials.

When in assembled operation, methane stream 10 and water stream 20 are blended to comprise a methane-water feed stream 150. Methane-water feed stream 150 enters catalyst filled steam reforming reaction chamber 120 via reactor inlet 60, where a steam reforming reaction takes place accordingly. Excess hydrogen is separated internally by use of substantially hydrogen only permeable membrane 130 in the reformer reactor. This excess hydrogen feeds into combustion zone 140. Air 40 is drawn into the combustion chamber 140 through air inlet 80 where it is combusted with the excess hydrogen to supply heat to and drive the endothermic steam reforming reaction taking place in reaction chamber 120. The product of the hydrogen combustion, along with any other gases in the combustion chamber are then exhausted through the exhaust opening 90. The combustion can be initiated by catalyst in the combustion zone, by establishing a flame or spark, by auto-ignition or by any other acceptable method. The heat generated from the hydrogen combustion maintains the high temperatures necessary for steam reforming inside reaction chamber 120, resulting in a product stream 30 containing primarily syngas which exits chamber 120 via outlet 70.

It is envisioned that the stackable system embodied in FIG. 3 should not be limited to a reactor in which the reaction zone 120 is completely enclosed in the combustion zone 140. It is envisioned that other embodiments of the present invention, such as those of FIGS. 2, 3, 4, 5, and 6, can also be configured as an assembly of multiple components. This stackable assembly will ease the transportability and assembly of the reactor system, thereby increasing its flexibility and mobility. Hence, this stackable embodiment can be a valuable tool for processing natural gas at remote locations.

Figure 4:
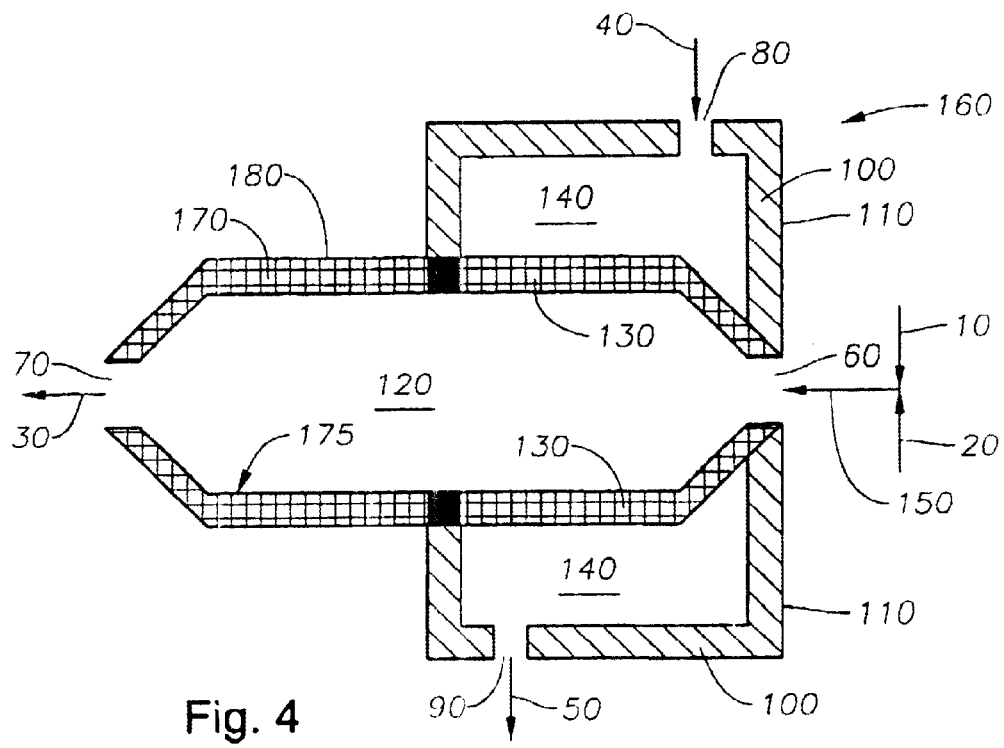
FIG. 4 is a cross-sectional schematic drawing of a fourth embodiment of the present invention.

Referring now to FIG. 4, there is shown an embodiment of the present invention in which the reaction chamber 120 is not completely enclosed within the combustion chamber 140. In FIG. 4, reformer reactor 160 includes a steam reforming reaction chamber 120, a reactor inlet 60 and a syngas outlet 70. Reaction chamber 120 is partially encased by a hydrogen permeable membrane 130 and a combustion zone 140. The remainder of reaction chamber 120 is encased by a reactor liner 175 comprised of refractory lining 170 and metal shell 180. Combustion zone 140 is encased by a refractory lining 100 and a metal shell 110 having an air inlet 80 and an exhaust opening 90. The reaction chamber 120 includes a catalyst system as herein defined.

In operation, methane stream 10 and water stream 20 are blended to comprise a methane-water feed stream 150.

Methane-water feed stream 150 enters steam reforming reaction chamber 120, where a steam reforming reaction takes place accordingly. Excess hydrogen is separated internally by use of substantially hydrogen only permeable membrane 130 in the reformer reactor. This excess hydrogen feeds into combustion zone 140. Air 40 is drawn into the combustion chamber 140 through air inlet 80 where it is combusted with the excess hydrogen to supply heat to and drive the endothermic steam reforming reaction taking place in reaction chamber 120. The exhaust 50, composed of the product of the hydrogen combustion along with any other gases in the combustion chamber, is then exhausted through the exhaust opening 90. The combustion can be initiated by catalyst in the combustion zone 140, by establishing a flame or spark, by auto-ignition, or by any other acceptable method. The heat generated from the hydrogen combustion maintains the high temperatures necessary for steam reforming inside reaction chamber 120, resulting in a product stream 30 containing primarily syngas which exits chamber 120 via syngas outlet 70.

Figure 5:
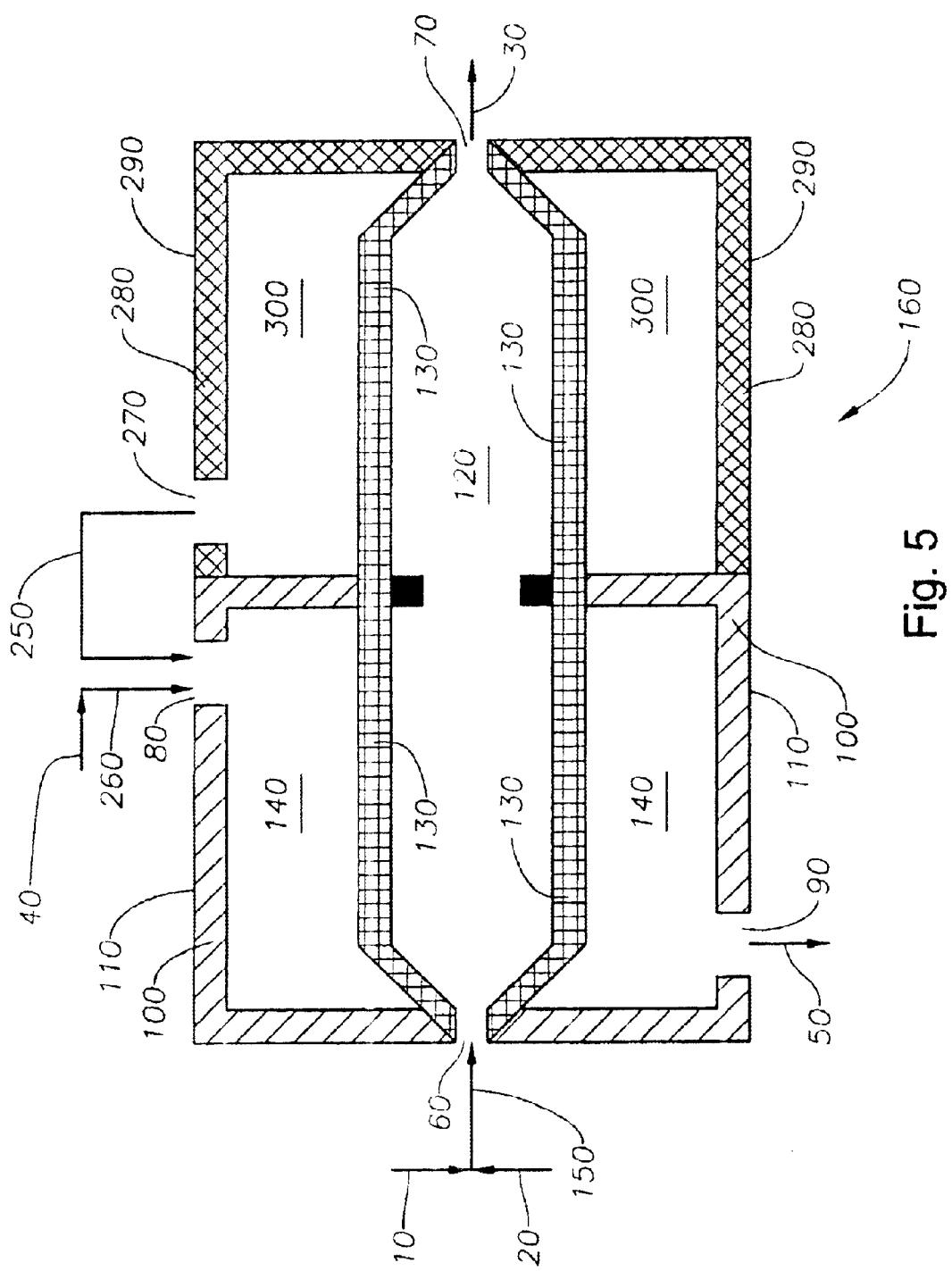
FIG. 5 is a cross-sectional schematic drawing of a fifth embodiment of the present invention.

Referring now to FIG. 5, there is shown an embodiment of the present invention which includes a combustion zone 140 encasing a portion of the reaction zone 120 and a recycle zone 300 encasing another portion of the reaction zone 120. Excess hydrogen permeates through substantially hydrogen only permeable membrane 130 into combustion zone 140 and recycle zone 300. At least a portion of the hydrogen permeating into the recycle zone 300 is recycled into combustion zone 140 where it is combusted with the hydrogen permeating directly into the combustion zone 140 from the reaction zone 120.

In operation, methane stream 10 and water stream 20 are blended to comprise a methane-water feed stream 150. Methane-water feed stream 150 enters steam reforming reaction chamber 120, where a steam reforming reaction takes place accordingly. Excess hydrogen is separated internally by use of substantially hydrogen only permeable membrane 130 in the reformer reactor. This excess hydrogen feeds into combustion zone 140 and recycle zone 300. At least a portion of the hydrogen permeating into the recycle zone 300 is recycled back into the combustion zone 140 via recycle stream 250. Air 40 is drawn into the combustion chamber 140 through air inlet 80 where it is combusted with the hydrogen that permeates directly into the combustion zone 140 and the recycle zone 250 to supply heat to and drive the endothermic steam reforming reaction taking place in reaction chamber 120. The exhaust 50, composed of the product of the hydrogen combustion along with any other gases in the combustion chamber, is then exhausted through the exhaust opening 90. The combustion can be initiated by catalyst in the combustion zone, by establishing a flame or spark, by auto-ignition, or by any other acceptable method. The heat generated from the hydrogen combustion maintains the high temperatures necessary for steam reforming inside reaction chamber 120, resulting in a product stream 30 containing primarily syngas which exits chamber 120 via syngas outlet 70. The hydrogen recycle stream 250 allows for localization of the hydrogen combustion in instances in which it is not desirable for the combustion to take place along the entire length of the reaction zone 120.

Figure 6:
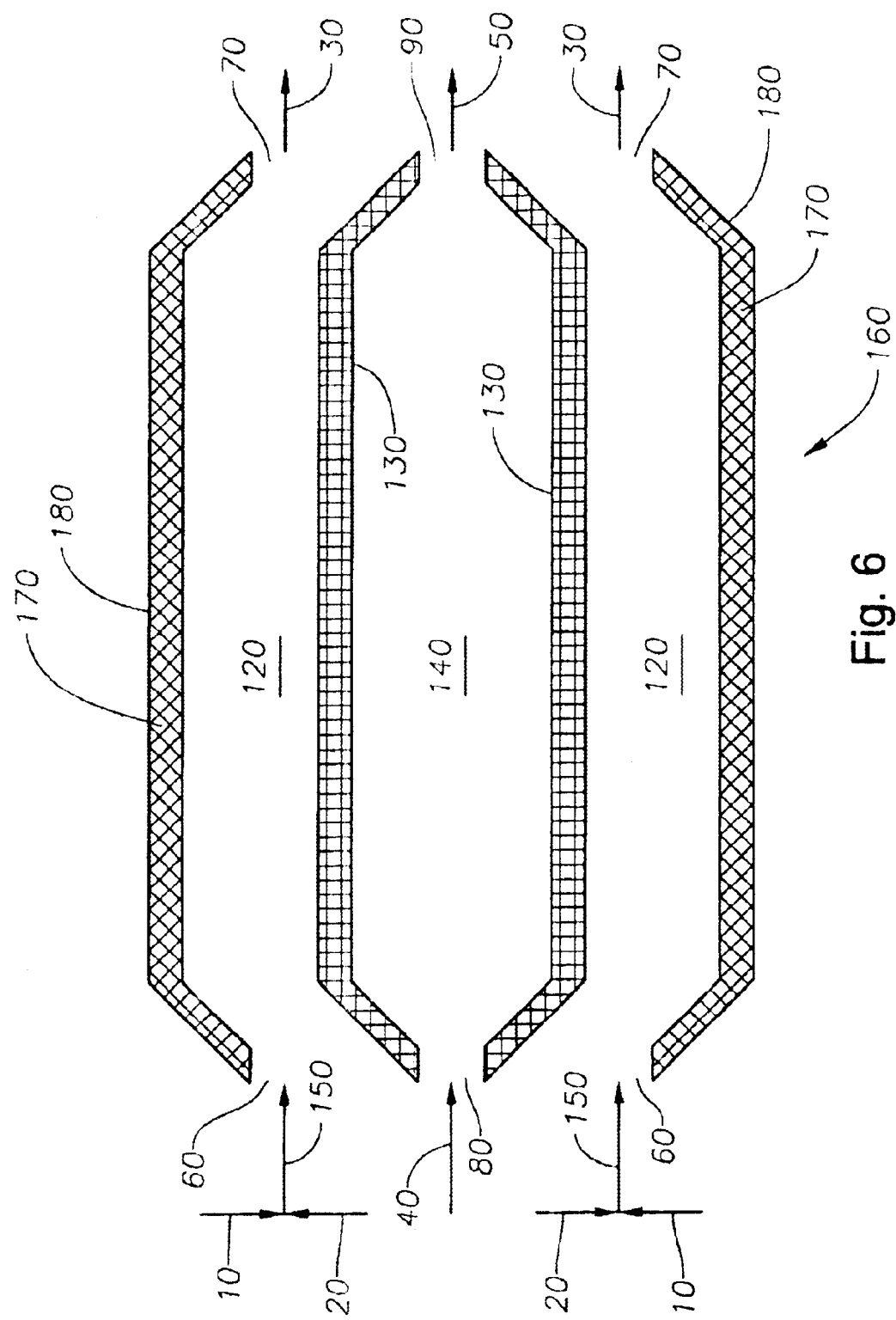
FIG. 6 is a cross-sectional schematic drawing of a sixth embodiment of the present invention.

Referring now to FIG. 6, there is shown an embodiment in which the combustion chamber 14 is encased by hydrogen permeable membrane 130 and reaction chamber 120.

In operation, methane stream 10 and water stream 20 are blended to comprise a methane-water feed stream 150. Methane-water feed stream 150 enters steam reforming reaction chamber 120, where a steam reforming reaction takes place accordingly. Excess hydrogen is separated internally by use of substantially hydrogen only permeable membrane 130 in the reformer reactor. This excess hydrogen feeds into combustion zone 140. Air 40 is drawn into the combustion chamber 140 through air inlet 80 where it is combusted with the excess hydrogen to supply heat to and drive the endothermic steam reforming reaction taking place in reaction chamber 120. The exhaust 50, composed of the product of the hydrogen combustion along with any other gases in the combustion chamber, are then exhausted through the exhaust opening 90. The combustion can be initiated by catalyst in the combustion zone, by establishing a flame or spark, by auto-ignition, or by any other acceptable method. The heat generated from the hydrogen combustion maintains the high temperatures necessary for steam reforming inside reaction chamber 120, resulting in a product stream 30 containing primarily syngas which exits chamber 120 via syngas outlet 70.

As can be seen, adding together the combustion and steam reforming reactions in the syngas generation embodiment of the present invention gives the overall reaction for syngas generation:

$$H_2 + \frac{1}{2}O_2 \rightarrow H_2O + \text{heat} \qquad (4)$$

$$CH_4 + H_2O + \text{heat} \rightarrow CO + 3H_2 \qquad (1)$$

$$CH_4 + \frac{1}{2}O_2 \rightarrow CO + 2H_2 + \text{heat} \qquad (3)$$

This overall reaction is the same as the primary reaction in a CPOX process (reaction 3). However, unlike CPOX, in the process of the present invention combustion is separated from the main reaction mixture and the combustion controlled by the amount of air made available to the combustion zone. This reduces many of the safety concerns present in a partial oxidation process.

The hydrogen permeable material used in the present invention should be resistant to high temperatures, preferably functioning at temperatures of at least about 800° C.–1000° C. A suitable material should also conduct heat well, resist oxidation, and allow for selective hydrogen mobility through the wall. A suitable material has sufficient heat transfer capabilities if for any desired configuration of the present invention, a sufficient amount of heat is transferred to the reaction zone to achieve the heat transfer objectives of that particular embodiment. For example, in the embodiment of FIG. 1, the heat transfer rate is sufficient if enough heat is transferred to drive the steam reforming reaction in the reaction zone without the need for an outside heat source. An example of such a material is a ceramic ion transport membrane, or more specifically, a mixed conduction membrane. A suitable material for the hydrogen permeable membrane is the modified Vycor® (Corning, Inc.) glass material disclosed in PRABHU AND OYAMA, *Development of a Hydrogen Selective Ceramic Membrane and Its Application for the Conversion of Greenhouse Gases*, 1999 Chemical Letters 213–14 ("PRABHU AND OYAMA"), the contents of which are incorporated herein by reference in their entirety for all purposes.

It is contemplated that any configuration in which the reaction zone is separated from the combustion zone by a selectively permeable membrane which allows substantially only a predetermined gas (or gases) to permeate will fall within the scope of the present invention. By way of example only, a coiled substantially hydrogen only permeable membrane tube residing within the combustion zone and a reaction zone sandwiched between two combustion zones wherein two substantially hydrogen only permeable membranes are employed to separate the reaction zone from the two combustion zones are contemplated to be within the scope of the present invention.

It is also contemplated that there may be configurations of the present invention in which membrane systems or multiple membranes may be used to achieve the desired gas separation. For example, a two-stage separation may be needed to achieve the desired final separation, in which case the membrane system would consist of a first membrane to achieve the first separation and a second membrane to further separate the product of the first separation.

It is further contemplated that the present invention is not limited to any particular directional relationship between the combustion zone flow and the reaction zone flow. For example, the arrows of FIG. 2 indicate that the flow in the combustion chamber is countercurrent to the flow in the reaction chamber. On the other hand, in FIG. 6, the flow within the combustion chamber and within the reaction zone are co-current and parallel. The present invention is not limited to any particular flow relationship. It can include countercurrent, unidirectional, perpendicular, parallel, skewed, or curved flows as well as any other acceptable flow relationship so long as the desired heat transfer is maintained.

The present invention allows for combustion internally in the reactor system without allowing nitrogen to dilute the product gas. The pressure differential between the inside of the catalyst tube where the reforming reaction takes place and the outside of the tube where combustion takes place provides the driving force for the hydrogen permeation through the membrane. Low combustion air pressure in the combustion chamber favors the transport of hydrogen through the membrane and the rate of hydrogen permeation can be controlled by controlling the pressure differential across the membrane. It should be noted, however, that the strength of the membrane material may create an upper limit to the pressure differential which may be achieved. Additionally, the rate of hydrogen permeation may be controlled by controlling the thickness of the membrane and the size of the membrane.

The reaction chamber does not need to be completely enclosed by the substantially hydrogen only permeable membrane. The membrane may be only a portion of the member that encloses the reaction zone so long as the substantially hydrogen only permeable membrane is between the reaction zone and the combustion zone and the reaction zone is separate from the combustion zone. Thus, in the syngas embodiments it is contemplated to control the rate of hydrogen permeation to tailor the syngas composition to the specific downstream process requirements or to tailor the rate of combustion. By analogy, in non-syngas embodiments, it is contemplated to control the rate of flammable gas permeation to tailor the product composition or to tailor the rate of combustion.

It is also possible to control the rate of flammable combustion in the combustion zone to control the amount of heat transferred to the reaction zone. The rate of combustion can be controlled by controlling the amount of air (more particularly, oxygen in air) available for combustion of the permeated combustible gas. A temperature sensor can be placed in the reaction zone, and the air flow through the combustion zone adjusted until the desired reaction zone temperature is achieved. The desired temperature may vary depending upon the circumstances.

The following definitions shall apply for the purposes of this specification.

"Excess hydrogen" is defined as any hydrogen generated by the reaction in the reaction zone which is not desired to be in the product stream. Likewise, in an embodiment other than the steam reforming embodiment described, "excess combustible gas" is any gas produced in the reaction chamber which is not desired to be in the product stream and which can be ignited in the presence of oxygen to produce heat. By way of example only, in the steam reforming embodiment in which the reaction produces three hydrogens for each carbon monoxide and the desired hydrogen to carbon monoxide ration in the product stream is two hydrogens for each carbon monoxide, the one extra hydrogen produced is an excess hydrogen.

The term "catalyst system" as used herein means any acceptable system for catalyzing the desired reaction in the reaction zone. By way of example only, the catalyst system of a syngas steam reforming reaction usually includes a support and a catalyst. The support may be, for example, particulates, pills, beads, granules, pellets, rings, monoliths, ceramic honeycomb structures, wire gauze, or any other suitable supports as are known in the art. Likewise, the catalyst may include, for example, a conventional steam reforming catalyst such as nickel. The above examples of supports and catalysts are only examples. There are a plethora of catalysts systems known in the art which would be acceptable and are contemplated to fall within the scope of the steam reforming embodiment of the present invention. Indeed in other embodiments of the present invention not involving syngas reforming, if a catalyst system is required at all, it will be within the skill of one of ordinary skill in the art to determine the proper catalyst system by modifying an existing process in accordance with the present disclosure.

The term "substantially hydrogen only permeable membrane" means a membrane which does not allow a significant amount of any substance other than hydrogen to permeate through the membrane.

The term "drive the reaction" means to provide heat to an endothermic reaction to aid in sustentation of the reaction. A first reaction is "completely driven" by a second reaction when enough heat is provided by the second reaction to sustain the first reaction without addition of heat from another source.

The term "membrane system" means a plurality of complimentary membranes that work together to achieve a desired separation. For example, a two-stage separation may be needed to achieve the desired final separation, in which case the membrane system would consist of a first membrane to achieve the first separation and a second membrane to further separate the product of the first separation.

What is claimed is:

1. A method for producing syngas with a hydrogen to carbon monoxide ratio of about 2:1 comprising the steps of:
    a) providing a combustion reactor;
    b) providing a steam reforming reactor having walls, wherein the steam reforming reactor is substantially inside of the combustion reactor and at least one wall of the steam reforming reactor comprises a substantially hydrogen-only permeable membrane;
    c) providing a catalyst system inside of the steam reforming reactor to catalyze the steam reforming of methane to produce syngas with a hydrogen to carbon monoxide ratio of about 3:1, wherein about ⅓ of the hydrogen generated permeates through the substantially hydrogen only permeable membrane into the combustion reactor; and
    d) combusting the permeated hydrogen in the combustion reactor to provide heat to drive the endothermic steam reforming reaction in the steam reforming reactor.

2. The method of claim 1 wherein the steam reforming reactor has a feed stream intake opening and a product stream outlet opening.

3. The method of claim 1 where in the combustion reactor has an oxygen intake opening and an exhaust opening.

4. A method of reducing the $H_2:CO$ molar ratio of a synthesis gas stream comprising:
providing a reactor system comprising:
(1) a first reactor having a steam reforming zone containing a catalyst bed, a reactant gas inlet and a synthesis gas outlet,
(2) a second reactor at least partially surrounding the first reactor and comprising a combustion zone, an air inlet and an exhaust gas outlet; and
(3) a thermally conductive substantially hydrogen only permeable membrane disposed between the reforming zone and said combustion zone,
contacting a mixture of methane and steam in the steam reforming zone with a catalyst capable of catalyzing the reaction $CH_4+H_2O \leftrightarrow H_2+CO$ under reaction promoting conditions, to provide a stream of product gas comprising hydrogen and carbon monoxide in a molar ratio of about 3:1;
maintaining a higher gas pressure in the first reactor than in the second reactor, such that a portion of the hydrogen product gas passes through the membrane into the combustion zone;
mixing a source of oxygen with the portion of hydrogen product gas in the combustion zone;
igniting the hydrogen and oxygen in the combustion zone to produce heat;
conducting at least a portion of the heat into the steam reforming zone such that the steam reforming reaction is at least partially sustained by the heat; and
harvesting a modified synthesis gas stream comprising a molar ratio less than about 3:1 of $H_2:CO$.

5. The method of claim 4 wherein said step of harvesting a modified synthesis gas stream comprises obtaining synthesis gas having a molar ratio of $H_2:CO$ of about 2:1.

6. A process for producing a syngas stream with a hydrogen to carbon monoxide ratio of a predetermined amount, the process comprising:
a means for steam reforming a hydrocarbon containing feed stream to produce a syngas stream with a hydrogen to carbon monoxide ratio of greater than the predetermined amount;
a means for in-situ separating excess hydrogen from the syngas stream; and
a means for combusting at least a portion of the excess hydrogen to produce heat to drive the means for steam reforming;
wherein the predetermined amount is about 2:1.

7. The process of claim 6 further comprising a means for supplying oxygen to the means for combusting.

8. The process of claim 6 further comprising a means for exhausting the combusted hydrogen from the means for combusting.

9. The process of claim 6 wherein the means for steam reforming comprises a catalyst system.

10. The process of claim 9 wherein the catalyst system comprises a catalyst support and a catalyst.

11. The process of claim 6 wherein the means for steam reforming comprises a catalyst comprising nickel.

12. The process of claim 11 wherein the catalyst is supported on a means for supporting the catalyst.

13. The process of claim 12 wherein the means for supporting the catalyst is selected from the group of particulates, pills, beads, granules, pellets, rings, monoliths, ceramic honeycomb structures, and wire gauze.

14. The means of process 6 wherein the hydrocarbon containing feed stream comprises primarily methane.

15. The means of process 6 wherein the hydrocarbon comprises primarily natural gas.

16. A reactor system for carrying out an endothermic reaction to form reaction products, the reactor comprising:
a first substantially enclosed reactor zone; and
a second substantially enclosed reactor zone in physical and thermal contact with the first reactor zone;
a third substantially enclosed zone in physical contact with said second reactor zone, the physical interface between said second reactor zone and said third zone defining a second contact surface, wherein at least a portion of said second contact surface comprises a selectively permeable membrane for allowing the first gas to pass from said second reactor zone to said third zone;
a recycle stream for recycling the first gas in said third zone into said first zone;
the physical interface between said first and second reactor zones defining a contact surface, wherein at least a portion of said contact surface comprises a selectively permeable membrane for allowing a first gas to pass from said second reactor zone to said first reactor zone;
wherein said first reactor zone is adapted for combusting the first gas and said second reactor zone is adapted for carrying out an endothermic reaction that produces the first gas; and
wherein the combustion of the first gas supplies heat to at least partially drive the endothermic reaction.

17. A reactor system for carrying out an endothermic reaction, the reactor system comprising:
a reaction zone substantially enclosed by a selectively permeable membrane;
a combustion zone surrounding the selectively permeable membrane, wherein the combustion zone is substantially enclosed by a reactor shell;
wherein the reactor shell has an oxygen inlet and an exhaust outlet;
wherein the reaction zone has a reactant inlet and a product outlet;
wherein the reactor system comprises a plurality of sections including at least an anterior section and a posterior section, wherein the plurality of section are detachable from each other when the reactor system is not in use.

18. The reactor system of claim 17 wherein the plurality of sections further include at least one intermediate section.

* * * * *